United States Patent [19]

Kobayashi et al.

[11] Patent Number: 4,609,089

[45] Date of Patent: Sep. 2, 1986

[54] IMPACT WRENCH FOR TIGHTENING TO A DESIRED LEVEL

[75] Inventors: Takashi Kobayashi, Habikinoshi; Masaru Mizuhara, Kashiharashi, both of Japan

[73] Assignee: Kabushiki Kaisha Kuken, Osaka, Japan

[21] Appl. No.: 453,003

[22] Filed: Dec. 27, 1982

[51] Int. Cl.[4] .......................... B23Q 5/06; F16D 43/20

[52] U.S. Cl. ........................................ 192/138; 173/12; 192/150

[58] Field of Search .................. 192/150, 138; 173/12; 81/470

[56] References Cited

U.S. PATENT DOCUMENTS

| | | | |
|---|---|---|---|
| 2,543,979 | 3/1951 | Maurer | 192/150 X |
| 3,572,447 | 3/1971 | Pauley et al. | 173/12 |
| 3,608,131 | 9/1971 | Hornschuch et al. | 173/12 |
| 3,948,328 | 4/1976 | Hiraoka et al. | 173/12 |
| 4,185,701 | 1/1980 | Boys | 173/12 |

*Primary Examiner*—Rodney H. Bonck
*Attorney, Agent, or Firm*—Jordan and Hamburg

[57] ABSTRACT

An impact wrench including a hammer and an anvil to which impacts are imparted by the hammer, the impact wrench comprising a pair of sensors located at a stationary section of the wrench wherein the sensors are electrically arranged so as to have different phases, the sensors being to detect the rebounds occurring on the anvil, a second sensor adapted to detect an angular displacement of the anvil from a time when the rebounds detected by the first sensors exceed a predetermined value, and means for stopping the motor.

3 Claims, 14 Drawing Figures

IMPACT WRENCH FOR TIGHTENING TO A DESIRED LEVEL

BACKGROUND OF THE INVENTION

The present invention relates to a wrench for use in fastening or unfastening bolts or nuts, and more particularly, to an impact wrench. More specifically, the present invention relates to an impact wrench whose operation is automatically stopped when the fastener is fully tightened.

A conventional impact wrench has a hammer carried on a rotor driven by a motor, which hammer is caused to rotate in association with the rotor during which the hammer repeatedly engages and disengages an anvil, thereby transmitting impacts thereto. Such impact wrenches are widely used in the component assembling lines, particularly in the automobile assembling line. The impact wrenches are operated by workers, wherein the extent of the fastening force depends on their personal fingers' touch. As a result, the period of time for fastening is likely to differ from operator to operator. Undesirable variations in fastening bolts or nuts has occurred.

OBJECTS AND SUMMARY OF THE INVENTION

The present invention aims at solving the problems pointed out with respect to the conventional impact wrench, and has for its object to provide an impact wrench whose operation is automatically stopped when the fastener, such as bolts or nuts, is fastened, thereby securing an equal amount of fastening force on the individual bolts and nuts.

Other objects and advantages of the present invention will become more apparent from the following description when taken in connection with the accompanying drawings, which show, for the purpose of illustration only, one embodiment in accordance with the present invention.

According to the present invention, an impact wrench including a hammer and an anvil to which impacts are imparted by the hammer, comprises a pair of sensors located at a staionary section of the wrench wherein the sensors are electrically located at different phases, the sensors being adapted to detect rebounds occurring on the rotating section of the wrench when the impacts are given to the anvil, and a further sensor adapted to detect the angular displacement of the rotating section from the time when the angle of the rebounds exceeds a predetermined value.

DETAILED DESCRIPTION OF THE INVENTION

Figure 5:
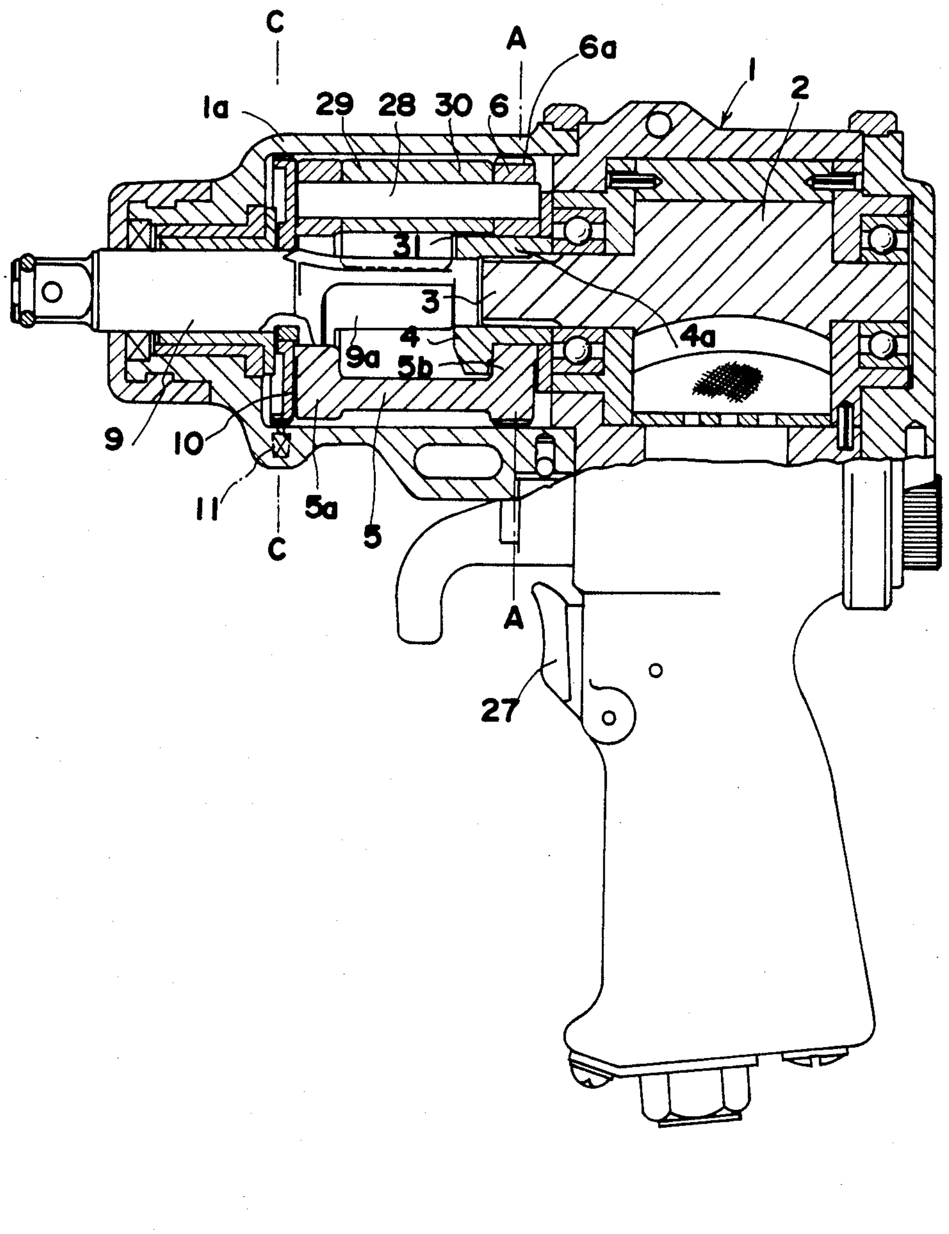
FIG. 5 is a vertical cross-sectional view of the impact wrench of FIG. 1.
Figure 11:
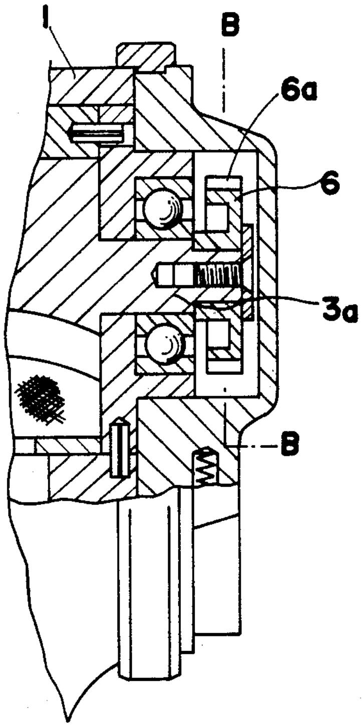
FIG. 11 is a cross-sectional view of a modified version of the embodiment, showing the modified section.
Figure 12:
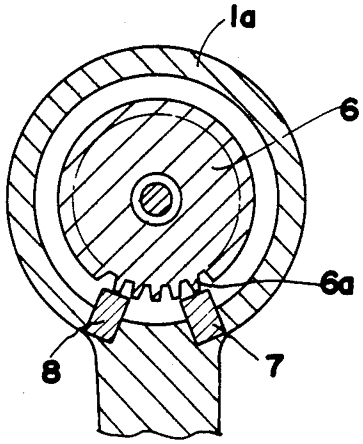
FIG. 12 is a vertical cross section taken along the line B—B in FIG. 11.

Referring to FIG. 5, an impact wrench, generally designated by the reference numeral 1, includes a pneumatic motor 2 driven in either a clockwise or anti-clockwise direction by a supply of compressed air from a source of supply 23, wherein the supply of compressed air is controlled by a trigger 27 and a changeover-valve (not shown). The pneumatic motor 2 has a rotary shaft 3 equipped with a cam disc 4 at its end. The cam disc 4 includes a boss **4*a* on which it is engageable with a rear portion 5*b* of a clutch member 5. The rear portion 5*b* of the clutch member 5 includes an integral toothed peripheral portion 6 wherein the teeth are designated by the reference numeral 6*a*. As shown in FIG. 11, the toothed portion 6 can be coaxially provided at the tail end of the rotary shaft 3. It can be located at any other place on the rotary shaft 3**.

Figure 6:
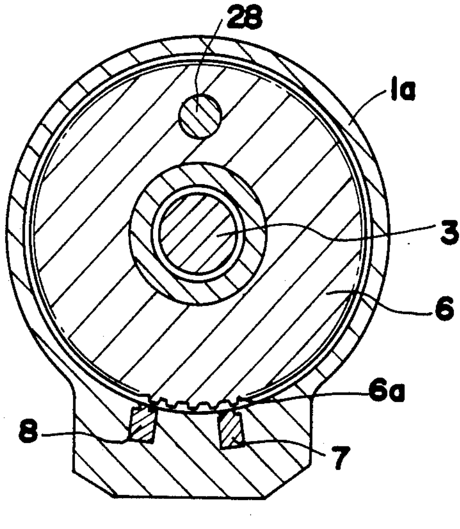
FIG. 6 is a cross section taken along the line A—A in FIG. 5.
Figure 7:
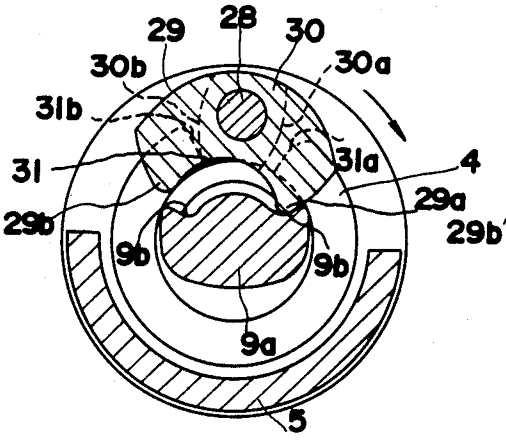
FIGS. 7 to 10 are views exemplifying the operation of the impact wrench of the present invention.
Figure 8:
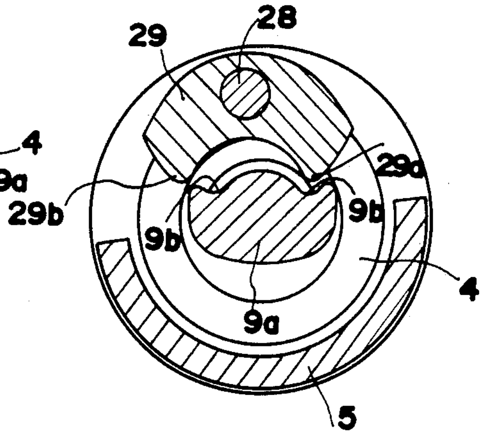
Figure 9:
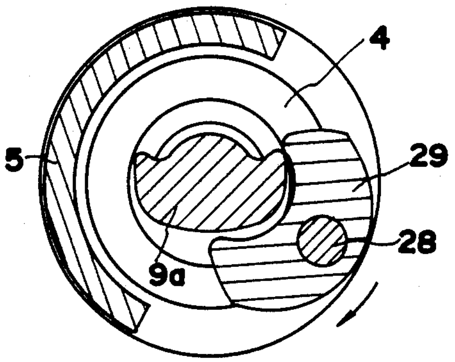
Figure 10:
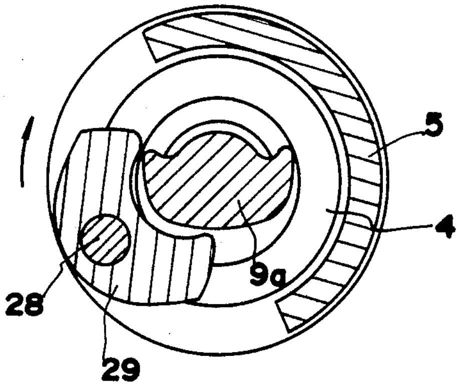

Referring to FIG. 6, there are provided a pair of sensor 7, 8 which are preferably embedded in a casing **1*a* of the impact wrench 1, adjacent to the teeth 6*a* of the toothed portion 6. The sensors 7, 8** are arranged such that the waveforms of their outputs are generated at 90° different phases. They can be electromagnetic or optical.

Figure 13:
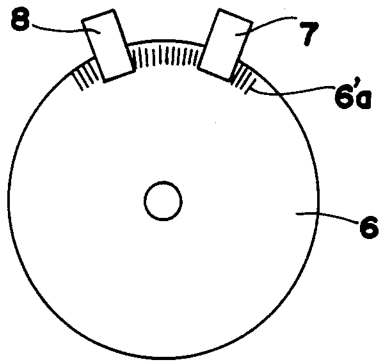
FIG. 13 is a schematic view showing a modified version of the detecting section incorporated in the impact wrench of FIG. 1.
Figure 14:
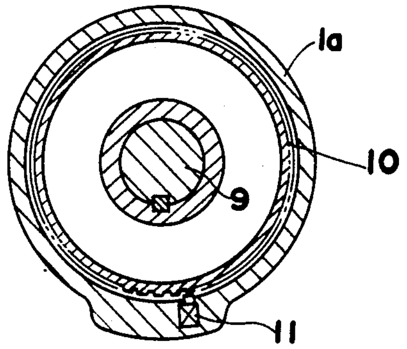
FIG. 14 is a cross section taken along the line C—C in FIG. 5.

The impact wrench 1 includes a rotatable anvil 9 at its terminating end portion, which anvil 9 is adapted to transmit rotations to the fasteners. The anvil 9 has an integral toothed wheel 10 adapted to permit the angular displacement of the anvil 9 for fastening to be detected by a sensor 11 embedded in the casing **1*a* of the impact wrench 1. This sensor 11 can be also electromagnetic or optical. FIG. 13 shows a modified version in which optical sensors 7, 8 are employed with the modification that the toothed portion 6 has a number of equally spaced slits 6*a'*** along its periphery.

Figure 2:
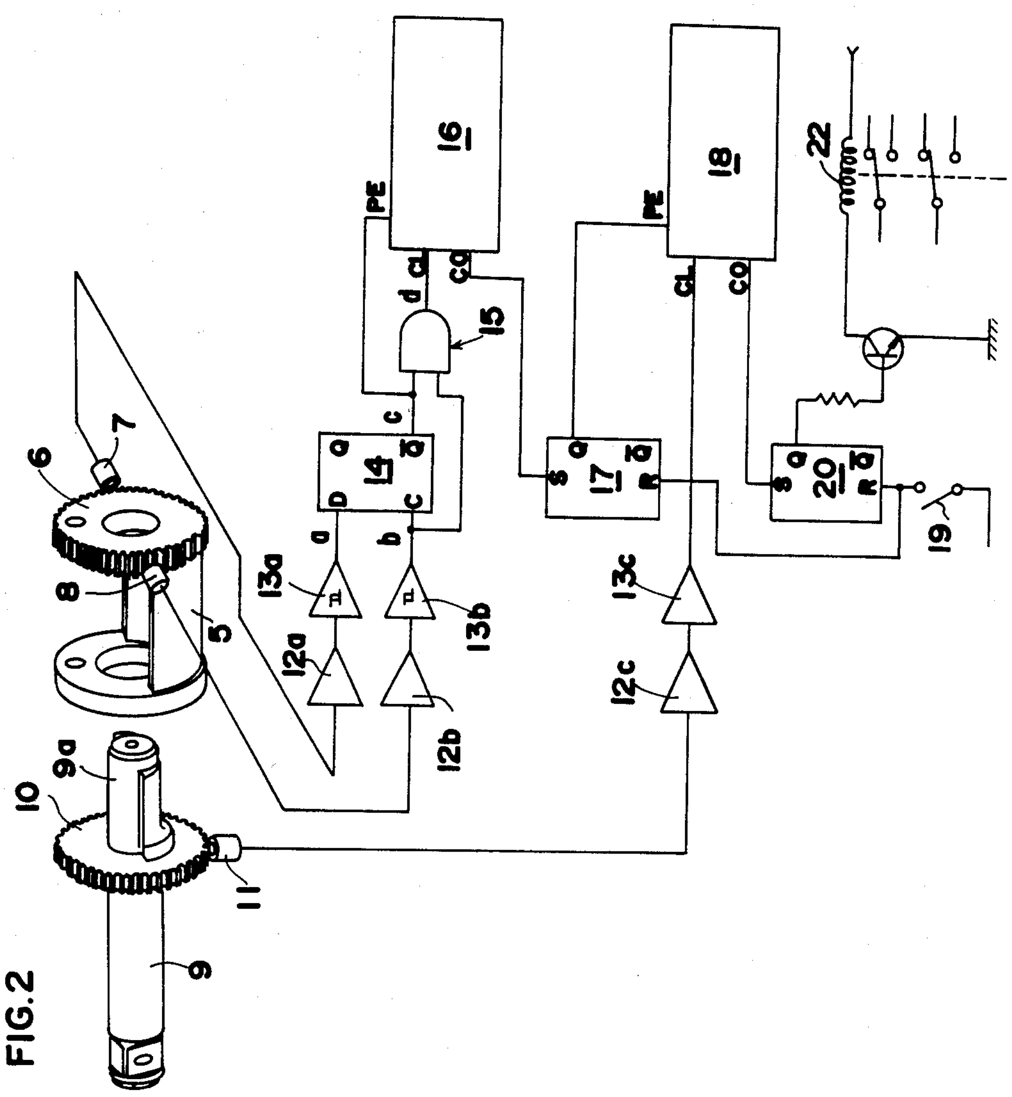
FIG. 2 is an electric diagram of the impact wrench of FIG. 1.

Referring to FIG. 2, the sensors 7, 8 are connected to a flip-flop 14 via amplifiers **12*a*, 12*b* and Schmidt trigger circuits 13*a*, 13*b*. The outputs of the sensor 8 and the flip-flop 14 are connected to an AND circuit 15. The flip-flop and the AND circuit 15 are connected to a preset counter 16, which counts the rebounds of the rotary shaft 3 i.e. the number of the teeth 6*a* of the toothed portion 6 in rebounds. The output of the preset counter 16 is connected to a flip-flop 17, which is connected at its output to a preset counter 18 adapted to detect the angular displacement of the fastener. The flip-flop 17 is additionally connected to a third flip-flop 20, which is connected to a reset button 19. The third flip-flop 20 is also connected to the preset counter 18 and a relay 22 which energizes a magnetic valve 21 (FIG. 3**).

The sensor 11 is connected to the preset counter 18 via an amplifier **12*c* and a Schmidt trigger circuit 13*c***.

Figure 1:
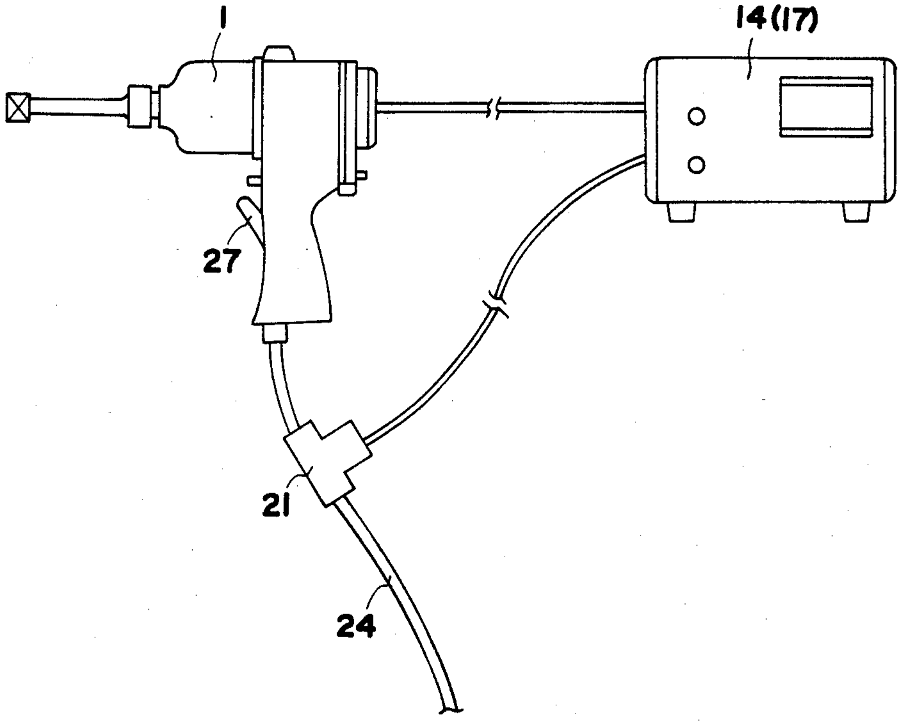
FIG. 1 is an overall view explaining an impact wrench in accordance with the present invention.
Figure 3:
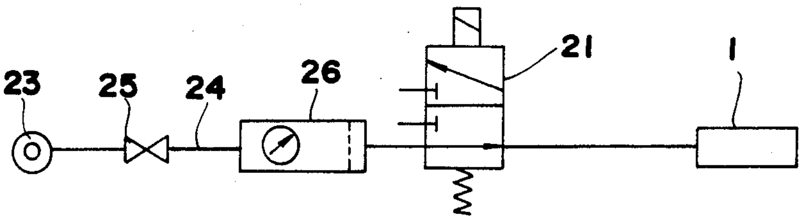
FIG. 3 is a block diagram showing a pneumatic passageway leading from the compressed air supplier to the impact wrench.

Referring to FIG. 3, the magnetic valve 21 is located in a duct 24 leading from the compressed air supplier 23 to the impact wrench 1. The reference numeral 25 designates a stop valve located midway between the magnetic valve 21 and the air supplier 23. The pressure of compressed air is controlled by an adjuster 26 located in the duct 24. It is also possible to locate the magnetic valve 21 in place within the casing 1*a* of the impact wrench 1.

As described above, the impact wrench 1 includes the trigger 27 whereby the changeover-valve (not shown) is operated to rotate the pneumatic motor 2 in either a clockwise or anti-clockwise direction. The rotary shaft 3 has a splined connection with the cam disc 4, thereby securing an unitary motion. The reference numeral 29 designates a rotary hammer connected to the clutch member 5 by means of a pin 28 such that the hammer 29 is angularly displaceable in a recess defined by the end walls 5*a*, 5*b* of the clutch member 5. The hammer 29 comes into engagement with the anvil body 9*a*, and when it engages same, the rotation of the pneumatic motor 2 is transmitted to the anvil 9.

The hammer 29 is made of an inwardly curved metal plate as shown in FIGS. 7 to 10, and at its center it is supported by the pin 28. The inner curved sides terminate at ridges 29*a*, 29*b*, which are engageable with recesses 9*b* formed in the anvil body 9*a*. The hammer 29 has an engaging portion 30 having outwardly curved sides 30*a*, 30*b*, which are engageable with a recess 31 formed on the periphery of the cam plate 4. When they are engaged therewith, their curved side faces are complementary with the inner sides 31*a*, 31*b* of the recess 31.

In operation, the impact wrench 1 is connected to the compressed air supplier 23. The sensors 7, 8 are electrically connected to the preset counter 16, and the magnetic valve 21 is connected to the preset counter 16, 18 by means of the relay 22 and third flip-flop 20. At this stage, the system is switched on. The preset button 19 is oppressed, and at the same time, the desired rebound angle and the desired angle displacement required for fastening the fastener are set to the preset counters 16, 18, respectively.

To start the operation, the trigger 27 is oppressed so as to cause the pneumatic motor 2 to rotate in the clockwise direction. In this way the rotation of the motor 2 is transmitted to the anvil 9 via the rotary shaft 3, the cam disc 4, the clutch member 5 and the hammer 29. The anvil 9 is provided with a socket (not shown) through which the fastners are rotated.

In accordance with the rotation of the rotary shaft 3 the toothed portion 6 of the clutch member 5 is rotated.

As the resistance increases on the fastener, it is transmitted to the pneumatic motor 2, thereby weakening its torque. As the speed of the anvil 9 is reduced, the ridge 29*a* of the hammer 29 is gradually disengaged from the recess 9*b* of the anvil body 9*a*, because the curved side 30*b* of the engaging portion 30 of the hammer 29 is pushed to rotate in the counter clockwise direction by the inner side 31*b* of the cam plate 4. Finally, the hammer 29 becomes free from the anvil 9, and starts its free running in accordance with the rotation of the motor 2. During the free running another ridge 29*a* of the hammer 29 comes into engagement with the recess 9*b* of the anvil body 9*a*. At this stage, if any resisting force exceeding the torque of the motor 2 occurs in the anvil 9, the engagement of the hammer 29 with the anvil body 9*a* is instantaneous or uncontinuous. The engagement and disengagement are repeated. As the resisting force increase, the engagement therebetween becomes impulsive, and the clutch member 5 initiates its reverse rotation (rebounding) through the hammer 29. In this way impacts are repeated, thereby tightening the fastener even more.

While the free running and the impulsive engagement are repeated, the sensors 7, 8 magnetically or optically detect the motions by emitting signals which are transmitted to flip-flop 14 via the amplifiers 12*a*, 12*b*, and the Schmidt trigger circuits 13*a*, 13*b* where the waveforms are shaped. The flip-flop 14 generates outputs Q or $\overline{Q}$ in accordance with the rotating directions of the clutch member 5, thereby detecting any impacts occurring in the wrench 1. As mentioned above, the waveforms (a), (b) of the signals from the sensors 7, 8 have 90° phase differences, and they are symmetrical with respect to an axis representing the time at which the normal rotation and the reverse (rebounding) rotation start.

Figure 4:
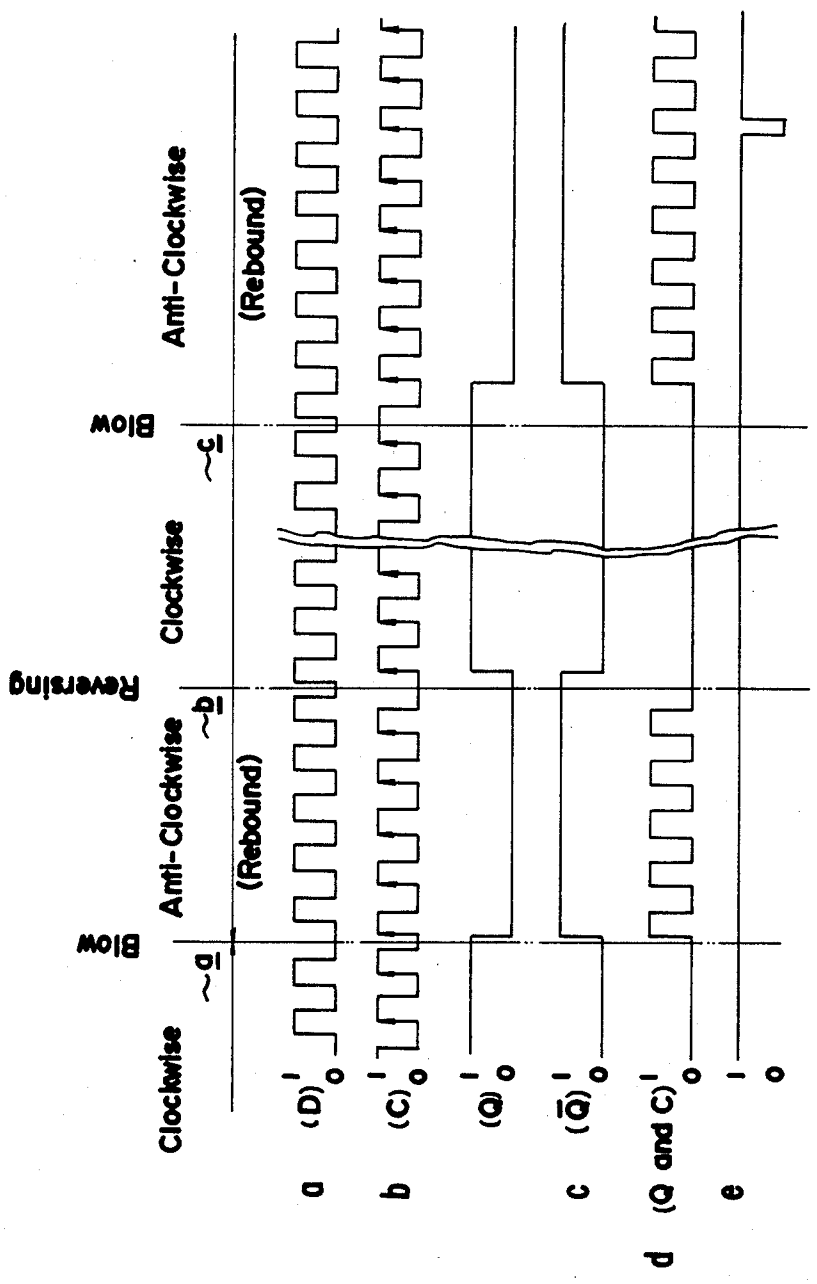
FIG. 4 is a diagram showing various waveforms of the pulses obtained in controlling the impact wrench of FIG. 1.

Referring to FIG. 4, until a blow is given by engagement of the hammer 29 with the recess 9*b* of the anvil body 9*a* (Period a), the output Q of the flip-flop 14 becomes "1". This means that so long as the clutch member 5 rotates in the clockwise direction, the output of the flip-flop is "1".

Likewise, when the hammer 29 is rebounded or rotated in the anti-clockwise direction (Period b), the output Q of the flip-flop 14 becomes "0".

After the rebounding of the hammer it is again rotated in the normal or clockwise direction (Period c). In this period the output of the flip-flop 14 becomes "1". When the period c expires, and the hammer 29 is again rebounded or rotated in the anti-clockwise direction, the output of the flip-flop 14 becomes "0". As evident from the foregoing, when the clockwise rotation of the hammer 29 is carried out, the output Q of the flip-flop 14 is constantly "1", whereas, when the anti-clockwise rotation or rebounding occurs, the output Q becomes "0". The rebounding of the hammer 29 is instantly overcome by the motor torque, which means that the output Q is immediately changed into "1".

On the other hand, the output $\overline{Q}$ of the flip-flop 14 is at the inverse phase to that of the output Q, and accordingly, when the clockwise rotation of the hammer 29 is carried out, it is constantly "0". When the anti-clockwise rotation or rebounding thereof occurs, it becomes "1".

As described above, the AND circuit 15 is provided between the outputs of the sensor 8 and the flip-flop 14. As a result, only when these two outputs are "1", the AND circuit 15 becomes "1", thereby outputting the number of the teeth for the period of rebounding.

The rebounding angle is previously set on the preset counter 16, wherein it is expressed by the number of teeth 6*a*. For example, 36° is desired for the rebounding angle, and the number of the teeth 6*a* is 60. In this case, one tooth has a resolving power of 6°. Therefore, the number of teeth is 6.

After the rebounding angle is preset on the preset counter 16, the impact wrench 1 is switched on. At the final stage of tightening the fastener the rebounding occurs on the hammer 29 in response to the blows given by it on the fastener. In FIG. 4, the number of teeth for the rebounding appears in the output (c), but even if this output (c) is input to the preset counter 16, the number of pulses is limited to 5 in the period of a to b, which is below the desired number "6". As a result, the preset counter 16 cannot generate a complete signal. This is accepted as an ineffect below.

The next is the period c where the clockwise rotation of the hammer 29 is carried out. At this stage, the output Q is reversed, and the preset counter 16 is reset. The normal blows are given. But soon the rebounding occurs, shifting to the period c. Here again, the output number of teeth is input to the preset counter 16. If the output number of teeth reaches the initially set number "6", the preset counter 16 generates a complete signal, whereby the blows are considered as 37 effective". This is an input to the flip-flop 17, whose output is transmitted to the preset counter 18 for detecting the angular displacement of the fastener. In this situation the fastener is placed in contact with the seat face at an optimum pressure, which means that the fastener is prepared to be driven into the fixture. This will be described in greater detail:

When the complete signal is transmitted to the second preset counter 18; in FIG. 4, the signal is designated by (e), the third sensor 11 is ready to detect the angular displacement of the fastener. As soon as the normal blows start after the complete signal has been output, the sensor 11 detects the number of teeth of the toothed wheel 10 of the anvil 9, and transmit it to the preset counter 18. In this way the effective blows are repeated until their total value reaches a value preset on the preset counter 18. When it reaches the predetermined value, the counter 18 generates a complete signal to the flip-flop 20, thereby causing the relay 22 to work to stop the operation of the air supplier 23 through the magnetic valve 21.

The reset button 19 is designed to reset the flip-flop 17 such that the supply of compressed air is prepared for starting. Alternatively, a timer can be employed whereby the whole system is returned to the original state after a predetermined period of time (selected from the period of 0.1 to 9.9 seconds) lapses.

As evident from the foregoing, according to the present invention the blows given on the fastener are distinguished as "ineffective" and "effective", and the "ineffective" blows are not counted, wherein the distinction is made by detecting whether the rebound angles reach a predetermined value or not. Moreover, the operation of the impact wrench is automatically stopped when the fastener is fully tightened. This is achieved by detecting a desired angular displacement of the rotating section of the wrench.

What is claimed is:

1. An impact wrench, comprising:

casing, rotating means situated inside a casing and adapted to be driven by driving means, means to be rotated by said rotating means, said means to be rotated being integrally situated on the clutch body and having teeth equally arranged on an outer periphery of the clutch body as first machine-readable indicia, clutch means rotationally situated in the casing, said clutch means including said clutch body, and a hammer pivotally connected to the clutch body, said hammer being engaged with the rotating means so that when the rotating means is operated, the clutch means is rotated, an anvil rotationally situated in the casing and having a circular member with second machine-readable indicia on an outer portion thereof, said anvil being continuously enganged with the hammer for continuous rotation of the anvil by means of the hammer in the absence of substantial external force acting against rotation of the anvil and said anvil being intermittently engaged with the hammer for intermittent rotation of the anvil by means of the hammer in the presence of substantial external force acting against rotation of the anvil, first sensing means situated in the casing adjacent to the first machine-readable indicia to detect rebounding angle of the means having first machine-readable indicia, said means having first machine-readable indicia rebounding when rotation of the anvil by striking by the hammer is greatly resisted by said external force, said first sensing means comprising at least one first sensor adjacent to the first machine-readable indicia, a first circuit connected to the first sensor to detect and count rebounding angle of the means having first machine-readable indicia, and a first preset counter comparing the rebounding angle of the means having first machine-readable indicia and the predetermined rebounding angle, said first preset counter emitting a signal only when the rebounding angle of the means having first machine-readable indicia exceeds the predetermined rebounding angle, second sensing means situated in the casing adjacent to the second machine-readable indicia of the circular member to detect angular displacement of the anvil, said second sensing means being actuated by means of the first sensing means after the first sensing means detects a predetermined rebounding angle, said second sensing means comprising a second sensor adjacent to the second machine-readable indicia of the circular member, a second preset counter comparing angular displacement of the anvil and the predetermined angular displacement, and a second circuit connected to the second preset counter, said second circuit operating to stop the driving means when said second preset counter emits a signal indicating that angular displacement of the anvil exceeds the predetermined angular displacement.

2. An impact wrench according to claim 1, in which said rotating means comprises a pneumatic motor, and a cam disc connected to the pneumatic motor, said disc having a recess therein.

3. An impact wrench according to claim 2, in which said hammer of the clutch means includes an engaging portion disposed in the recess of the cam disc, and two ridges to be engaged with the anvil so that when the anvil is easily rotatable, one of the ridges engages the anvil to rotate the same by the rotating means, and when the anvil is strongly prevented from rotation by external force, the one of the ridges disengages the anvil by force applied to the engaging portion of the hammer by means of the cam disc to thereby allow the clutch means to freely rotate around the anvil.

* * * * *